United States Patent
Hinson, II et al.

[11] Patent Number: 6,023,844
[45] Date of Patent: *Feb. 15, 2000

[54] METHOD AND CUTTING BLADE FOR ACCESSING OPTICAL FIBERS WITHIN A BUFFER TUBE

[75] Inventors: Alfred L. Hinson, II, Hickory; William D. Johnson, Jr., Granite Falls, both of N.C.

[73] Assignee: Alcatel NA Cable Systems, Inc., Claremont, N.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/624,681

[22] Filed: Mar. 25, 1996

[51] Int. Cl.⁷ ..................................................... B21F 13/00
[52] U.S. Cl. ............................................. 30/90.8; 30/90.4
[58] Field of Search ..................... 30/90.8, 90.4, 30/90.9, 91.1; 81/9.4, 9.51

[56] References Cited

U.S. PATENT DOCUMENTS

| | | | |
|---|---|---|---|
| 2,347,956 | 5/1944 | Lansing | 30/91.1 |
| 2,380,725 | 7/1945 | Crowder | 30/91.1 |
| 4,154,385 | 5/1979 | Lewis . | |
| 4,386,541 | 6/1983 | Robertson et al. . | |
| 4,459,745 | 7/1984 | Britton | 30/90.4 |
| 4,573,617 | 3/1986 | Durkow . | |
| 4,618,084 | 10/1986 | Andrews et al. . | |
| 4,972,581 | 11/1990 | McCollum et al. . | |
| 5,009,006 | 4/1991 | Sawyer | 30/91.1 |
| 5,093,992 | 3/1992 | Temple, Jr. et al. . | |
| 5,140,751 | 8/1992 | Faust | 30/91.1 |
| 5,172,620 | 12/1992 | Faust . | |
| 5,188,268 | 2/1993 | Hakoun et al. . | |
| 5,213,244 | 5/1993 | Curtis et al. . | |
| 5,243,882 | 9/1993 | Stepan . | |
| 5,295,421 | 3/1994 | Mansfield . | |
| 5,301,868 | 4/1994 | Edwards et al. . | |
| 5,359,690 | 10/1994 | Kaizu et al. . | |
| 5,376,099 | 12/1994 | Ellis et al. . | |
| 5,377,564 | 1/1995 | Erlich . | |
| 5,443,536 | 8/1995 | Kiritsy et al. . | |
| 5,460,682 | 10/1995 | Beasley et al. . | |
| 5,577,150 | 11/1996 | Holder et al. | 30/90.4 |

FOREIGN PATENT DOCUMENTS

| | | | |
|---|---|---|---|
| 628724 | 9/1949 | United Kingdom | 30/90.8 |

*Primary Examiner*—Kenneth E. Peterson
*Attorney, Agent, or Firm*—Ware, Fressola, Van der Sluys & Adolphson LLP

[57] ABSTRACT

An improved method and cutting blade having two cutting prongs with sharpened cutting tips attached thereto, for accessing optical fibers contained in a buffer tube is provided. When the cutting blade is mounted in an optical fiber access tool, relative movement of the tool with respect to the buffer tube causes the sharpened cutting tips to score the buffer tube so that a section of the buffer tube can be separated from the buffer tube to provide access to the optical fibers contained therein.

2 Claims, 4 Drawing Sheets

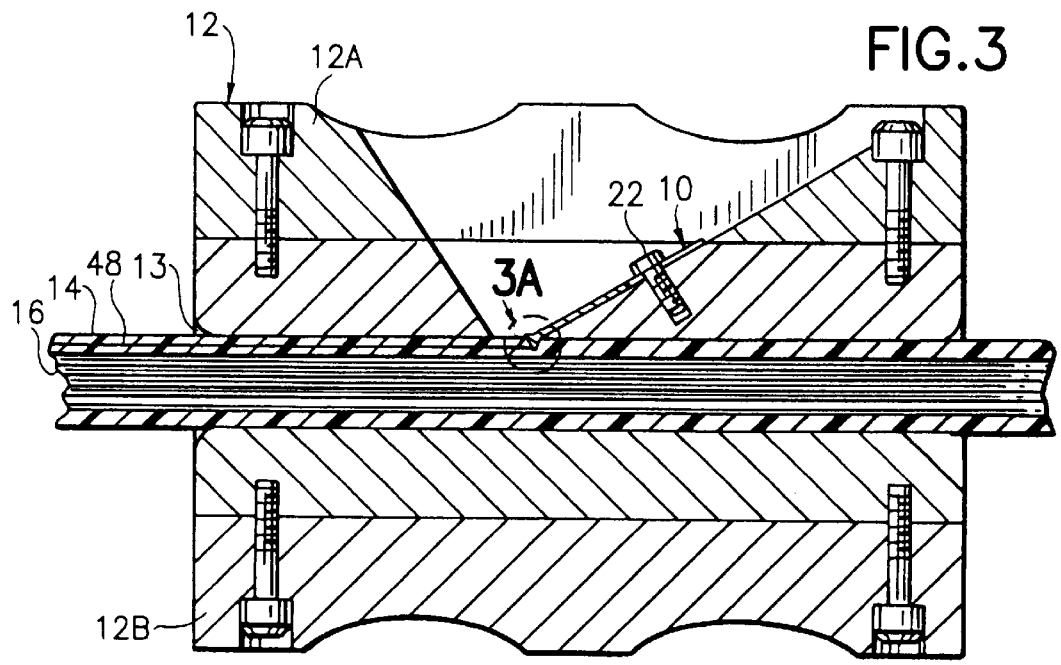
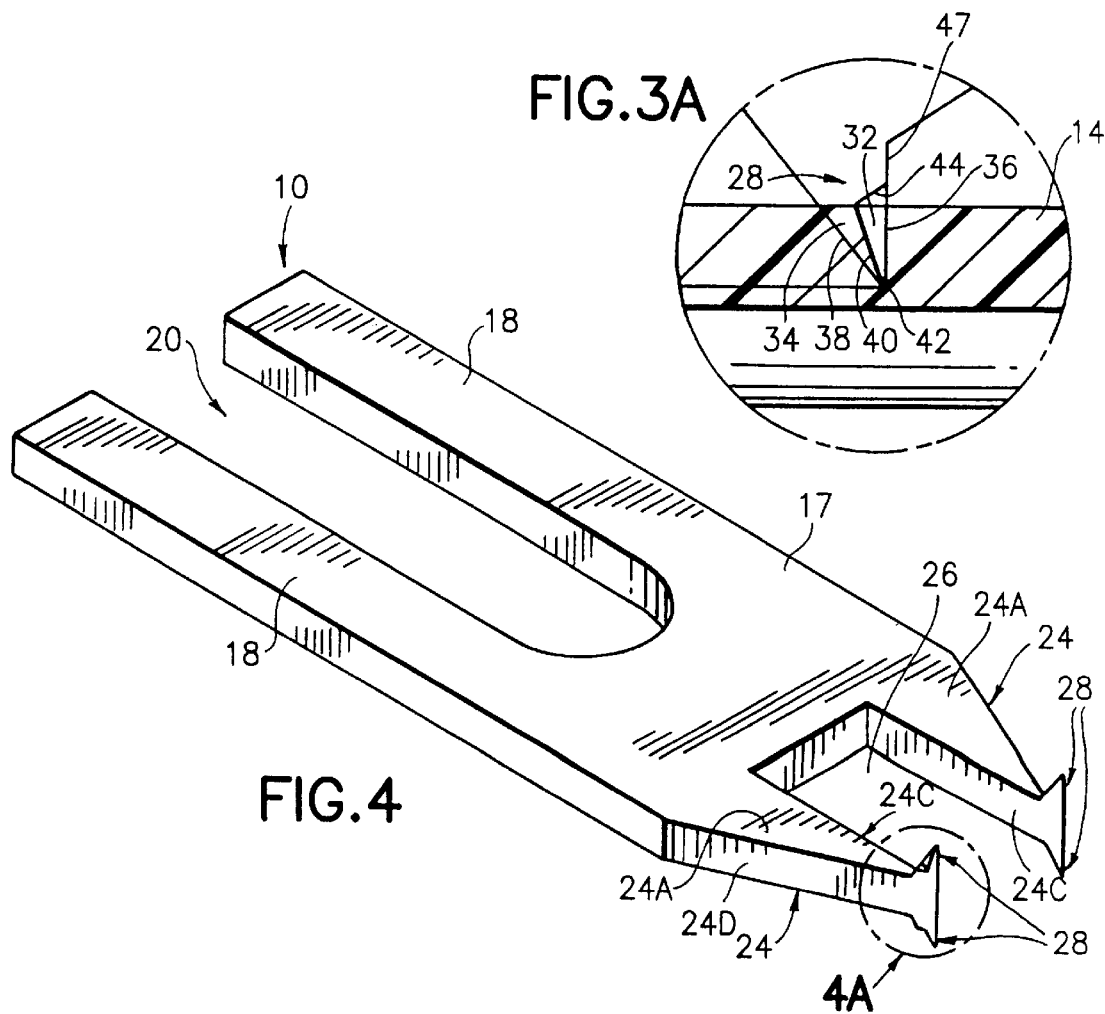

METHOD AND CUTTING BLADE FOR ACCESSING OPTICAL FIBERS WITHIN A BUFFER TUBE

BACKGROUND OF THE INVENTION

1. Field of the Invention

The present invention relates generally to an improved method and cutting blade for accessing optical fibers within a buffer tube and, in particular, relates to a cutting blade having a plurality of sharpened cutting tips attached thereto, for scoring a buffer tube so as to provide access to optical fibers contained therein.

2. Description of the Prior Art

The use of protective buffer tubes for packaging optical fibers is well known in the telecommunications industry. Buffer tubes protect the optical fibers from stress induced attenuation and physical damage. Typically, the optical fibers are loosely laid in the buffer tubes and the loose space within the tubes is filled with a gel to provide lubrication, water resistance and minimize the stress placed on the fibers.

As with conventional electrical conducting cable, splices to optical fiber cables are inevitable for connecting multiple cable lengths to construct a route, repairing a fiber breakage, re-routing service or adding an intermediary device. Often, this may involve accessing individual optical fibers contained in a buffer tube while leaving the remaining optical fibers intact.

Accessing optical fibers contained in a buffer tube typically involves using an optical fiber access tool to cut open the buffer tube. Although many different types of optical fiber access tools are available they are generally of either the radial slitting or shaver types.

Radial slitters feature a radially mounted cutting blade for slitting a buffer tube along its length. In contrast, the shaver type tools typically mount a cutting blade transversely to the length of the buffer tube to remove a chord of buffer tube. However, the blade is often hidden from view of the user in either arrangement, which may result in a more intrusive cut than necessary, possibly damaging the underlying optical fibers. Even if the blade is in clear view of the user, it can be difficult to set the blade depth to avoid damaging the optical fibers inside the buffer tube. In addition, because of the large force required to cut through thick or hard buffer tubes, conventional tools can bind or chatter, damaging or breaking the buffer tube and the optical fibers contained therein.

Consequently, a method and cutting blade for accessing optical fibers contained in a buffer tube which operates with minimal intrusion into the buffer tube and requires a low pulling resistance is highly desirable.

SUMMARY OF THE INVENTION

The present invention is designed to overcome the limitations inherent in the methods and apparatus discussed above and toward this end it includes an improved method and cutting blade having a plurality of sharpened cutting tips attached thereto, for accessing optical fibers within a buffer tube. When mounted in an optical fiber access tool, relative movement of the tool with respect to the buffer tube causes the plurality of sharpened cutting tips to score the buffer tube so that a section of the buffer tube can be easily removed, providing access to the optical fibers contained therein.

The present invention provides access to optical fibers contained in a buffer tube with minimal intrusion into the buffer tube by a cutting blade which has a low pulling resistance, thereby minimizing the possibility of damage to the optical fibers contained therein.

Others advantages will become apparent to those skilled in the art from the following detailed description read in conjunction with the appended claims and drawings attached hereto.

BRIEF DESCRIPTION OF THE DRAWINGS

The drawings, not drawn to scale, include:

FIG. 3 which is a cross sectional view taken along line 3—3 of FIG. 2;

FIG. 3A which is an enlarged cross sectional view of a portion of FIG. 3;

FIG. 4 which is a perspective view of the cutting blade of the present invention;

DETAILED DESCRIPTION OF THE INVENTION

Figure 1:
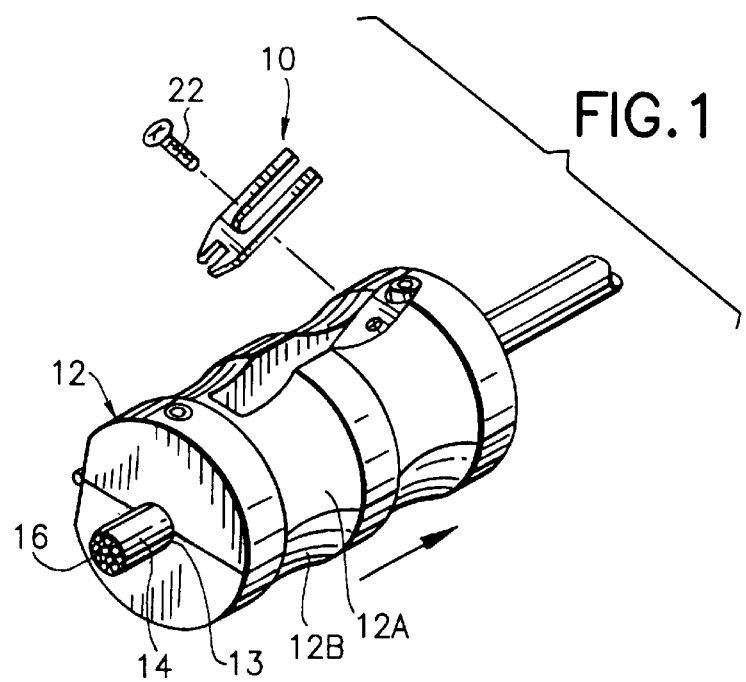
FIG. 1 which is an exploded perspective view of a cutting blade of the present invention employed in a tool for accessing optical fibers within a buffer tube.

Referring first to FIG. 1, therein illustrated is a cutting blade of the present invention, generally indicated by the numeral 10, mountable in an optical fiber access tool 12, for scoring a buffer tube 14 so as to provide access to optical fibers 16 contained therein. The tool 12 is a conventional shaver type tool having upper and lower halves 12A, 12B which are shaped to form a bore 13 for receiving the buffer tube 14. As will be appreciated by one skilled in the art, the specific design of the tool 12 is not critical since the cutting blade 10 of the present invention is easily adapted for use in a wide variety of tool designs.

Figure 5:
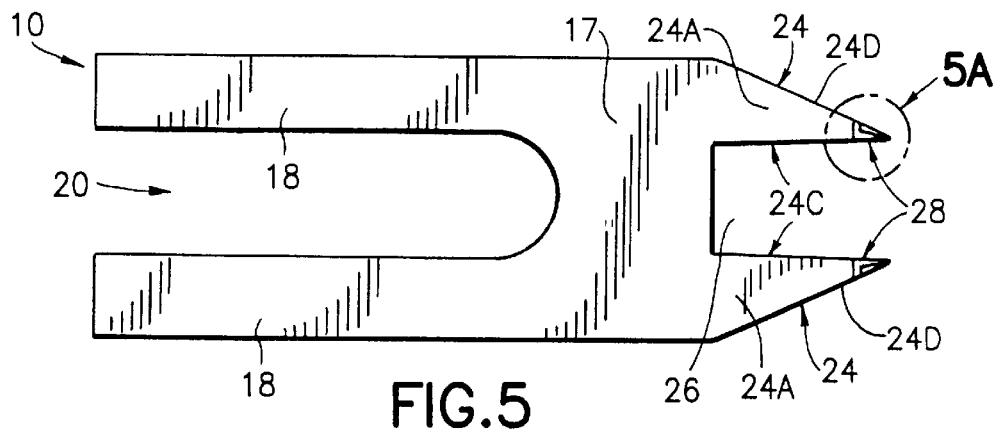
FIG. 5 which is a top plan view of the cutting blade of FIG. 4.
Figure 6:
FIG. 6 which is a side plan view of the cutting blade of FIG. 4.

As shown in FIGS. 4, 5 and 6, the cutting blade 10 is reversible and substantially symmetrical in shape. The cutting blade 10 includes a base portion 17 and a pair of mounting legs 18, formed by a generally rectangular shaped mounting cutout 20, attached to the base portion 17. The mounting legs 18 provide for the mounting of the cutting blade 10 to the optical fiber access tool 12, using a mounting screw 22 (FIGS. 1 and 3) or other suitable means. Of course, various other mounting configurations could be provided for the cutting blade 10 of the present invention. For example, the cutting blade 10 could be provided with several screw holes (not shown), the location of the screw holes being selected for various tools and various diameter buffer tubes 14.

The cutting blade 10 also includes a pair of cutting prongs 24, attached to the base portion 17, which are formed by a rectangular cutout 26. Each of the cutting prongs 24 include top and bottom opposing planar surfaces 24A, 24B and inner and outer surfaces 24C, 24D. As best shown in FIGS. 4, 4A, 6 and 6A, each cutting prong 24 also includes two sharpened cutting tips 28, which are integrally attached to and protrude substantially perpendicular from, the top and bottom opposing planar surfaces 24A, 24B. This arrangement allows the cutting blade 10 to be flipped in the tool 12, providing two sharpened cutting tips 28, should either of the sharpened cutting tips 28 in use become dull or damaged. Instead of providing sharpened cutting tips 28 on both sides of the cutting prongs 24, the sharpened cutting tips 28 may be provided on only one side of the cutting blade 10 to provide a non-reversible cutting blade 10, in accordance with the present invention. However, as would be readily understood by one skilled in the art, the cutting prongs 24 could be fitted with any number of sharpened cutting tips 28, disposed at various locations and angles, without departing from the scope of the present invention. Alternatively, instead of cutting prongs 24, the cutting blade 10 could be a curved or shaped single piece while providing for the separated but simultaneous contact of the sharpened cutting tips 28 with the buffer tube 14.

Figure 5A:
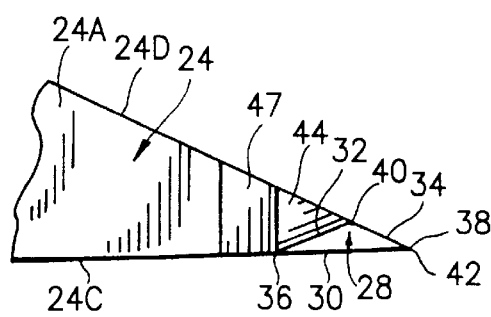
FIG. 5A which is an enlarged top plan view of a portion of FIG. 5.
Figure 4A:
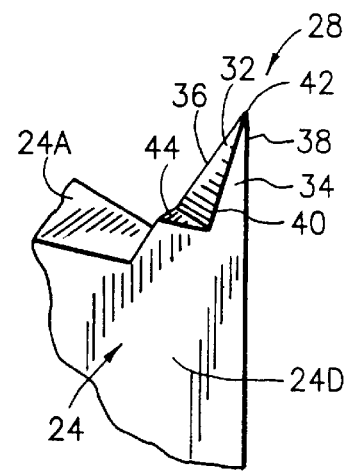
FIG. 4A which is an enlarged perspective view of a portion of FIG. 4.
Figure 6A:
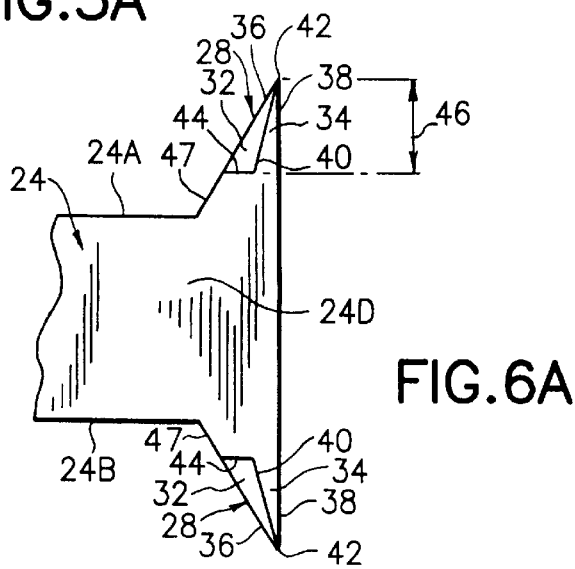
FIG. 6A which is an enlarged side plan view of a portion of FIG. 6.

As best shown in FIGS. 4A, 5A and 6A, each of the sharpened cutting tips 28 includes several generally triangular shaped faces. These include an inner face 30, which is part of inner surface 24C, a leading outer face 32 and a trailing outer face 34, which join to define several edges. Specifically, a leading cutting edge 36 is defined by the junction of the inner face 30 and the leading outer face 32. Similarly, a trailing cutting edge 38 is defined by the junction of the inner face 30 and a trailing outer face 34. The junction of the leading and trailing outer faces 32, 34 defines a side edge 40. Finally, the junction of all three faces, namely, the inner face 30, the leading outer face 32 and the trailing outer face 34 defines a sharp cusp 42.

As best shown in FIGS. 4A, 5A and 6A, each sharpened cutting tip 28 also includes a triangular shaped ledge 44, located approximately midway between the cusp 42 and the top and bottom opposing planar surfaces 24A, 24B oriented substantially parallel to the opposing planar surfaces 24A, 24B and which defines the length of the leading outer face 32. The ledge 44 performs the critical role of limiting the penetration depth, indicated by the reference numeral 46, of each sharpened cutting tip 28 as described in more detail below. Finally, each sharpened cutting tip 28 includes a frontal face 47 which joins the ledge 44 to the top and bottom opposing planar surfaces 24A, 24B.

Figure 2:
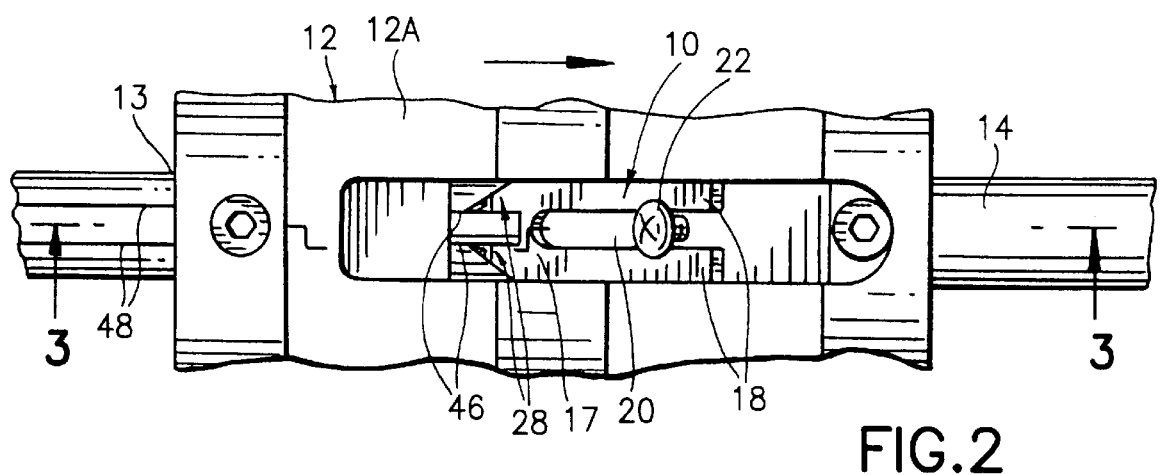
FIG. 2 which is a top assembled view of the tool of FIG. 1.
Figure 7A:
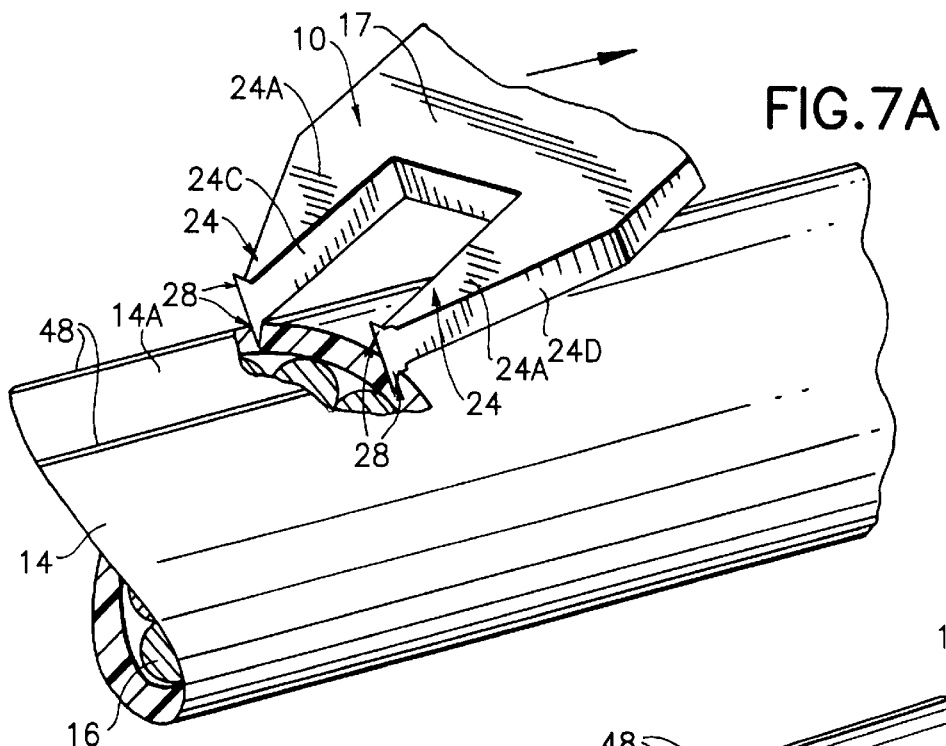
FIG. 7A which is a perspective view of a cutting blade according to the present invention (tool not shown) scoring a buffer tube.

Once the cutting blade 10 has been mounted into the tool 12, as illustrated in FIG. 3, the tool 12 is placed around the buffer tube 14. Joining the upper and lower halves 12A, 12B forces the cusp 42 of each sharpened cutting tip 28 to penetrate the buffer tube 14. As shown in FIGS. 3A and 7A, relative movement of the cutting blade 10 with respect to the buffer tube 14 (tool 12 not shown), scores the buffer tube 14 at score locations 48. As the cutting blade 10 is drawn along the buffer tube 14, the ledge 44 rests against the buffer tube 14, preventing the sharpened cutting tips 28 from penetrating completely through the buffer tube 14. Although the leading cutting edge 36 performs the scoring of the buffer tube 14 when the cutting blade is used in the direction shown in FIGS. 1, 2 and 7A, the trailing cutting edge 38 will score the buffer tube 14 if the cutting blade 10 is used in the opposite direction, allowing the cutting blade 10 to be used in both directions.

Figure 7B:
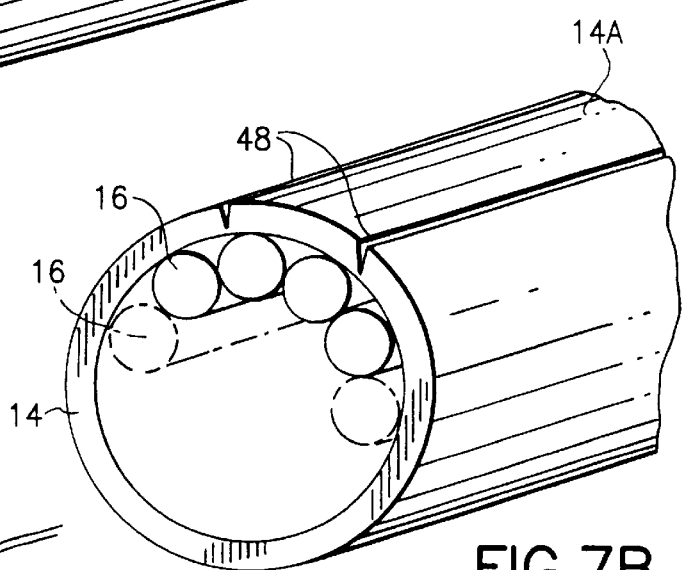
FIG. 7B which is a perspective view of a buffer tube which has been scored by a cutting blade of the present invention.
Figure 7C:
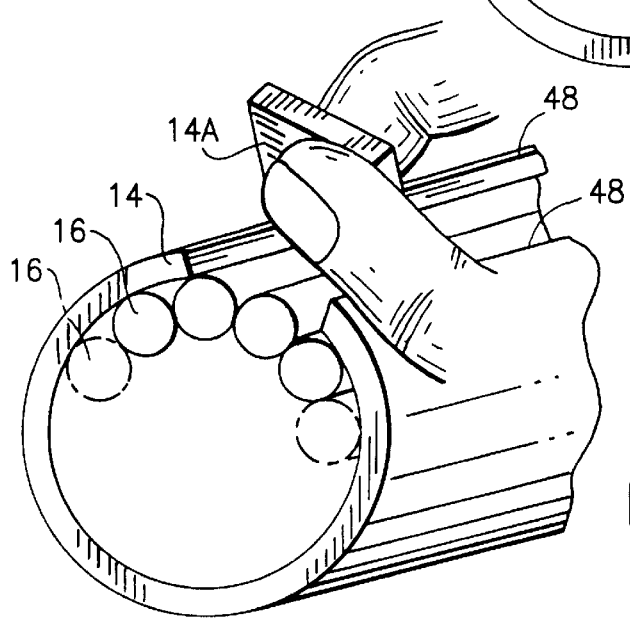
FIG. 7C which is a perspective view of a section of the buffer tube being removed.

The dimensions of the sharpened cutting tips 28 are selected for a buffer tube 14 having a specific wall thickness so that the sharpened cutting tips 28 will substantially, but not completely, penetrate the buffer tube 14. As best shown in FIGS. 7B and 7C, this ensures that the section 14A of buffer tube 14 between the score locations 48 can be easily separated from the buffer tube 14 without damaging the optical fibers 16 contained therein. Of course, as would be appreciated by one skilled in the art, for multi-layered buffer tube applications, the cutting blade 10 could be dimensioned to completely penetrate through one or more outer layers of a multi-layer buffer tube (not shown) while only scoring the innermost layer.

FIGS. 7B and 7C illustrate the cutting blade 10 being used to score a buffer tube 14 near one end of a splice. When the scored section 14A is pealed back, it may easily be removed by scoring or cutting completely through the section 14A. Of course, when removing the section 14A, care must be taken so that the underlying optical fibers 16 are not damaged.

On the other hand, if the cutting blade 10 is used to score a central section (not shown) of a buffer tube (intermediate the length of the buffer tube), a ring cutter is typically used to cut across the section 14A near the ends of the score locations 48. The section 14A may then be removed as described above, again taking care not to damage the underlying optical fibers 16.

In one embodiment of the present invention, the entire cutting blade 10 including the mounting legs 18, cutting prongs 24 and sharpened cutting tips 28, are ground from a single piece of D2 tool steel, having an approximate hardness of 54–55Rc and a uniform thickness of approximately 0.05 inches. As would be appreciated by one skilled in the art, the specific materials and dimensions are selected for the specific application. For example, the sharpened cutting tips 28 could be fabricated separately from a different, harder, material and then attached to the cutting prongs 24.

As will be appreciated from the description provided herein, the invention has been described with respect to a particular embodiment of the cutting blade 10. However, it will be understood by those skilled in the art that the cutting blade 10 of the present invention may be provided in a variety of configurations provided that a pair of juxtaposed sharpened cutting tips 28 are provided, each having a leading and trailing sharpened cutting edge 36, 38 and means 44 to limit penetration of the cusp 42 and leading and trailing cutting edges 36, 38 into the buffer tube 14. The means 44 to limit penetration is selected to prevent the sharpened cutting tips 28 from penetrating the innermost surface of a single or multiple buffer tube configuration to thereby prevent damage to the underlying optical fibers 16.

Although the present invention has been described and discussed herein with respect to at least one exemplary embodiment thereof, other arrangements or configurations may also be used that do not depart from the spirit and scope hereof.

What is claimed is:

1. A cutting blade for longitudinally scoring a buffer tube, said cutting blade comprising:

A) a base portion being bifurcated into first and second prongs, each said prong extending generally in a first direction;

B) a first sharpened cutting tip attached to said first prong and extending from said first prong in a second direction extending substantially perpendicular to said first direction and substantially perpendicular to a line drawn between said first and second prongs, said first cutting tip having a unitary depth limiting means formed thereon spaced from the first prong for limiting penetration of said first sharpened cutting tip into the buffer tube so that said first sharpened cutting tip does not completely penetrate through an inner surface of the buffer tube; and C) a second sharpened cutting tip attached to said second prong and extending from said second prong in said second direction in a spaced apart relationship to said first sharpened cutting tip, said second cutting tip having a unitary depth limiting means formed thereon spaced from the second prong for limiting penetration of said second sharpened cutting tip into the buffer tube so that said second sharpened cutting tip does not completely penetrate through an inner surface of the buffer tube, wherein the first and second sharpened cutting tips are oriented such that they point in generally the same direction and such that relative longitudinal movement of said cutting blade with respect to the buffer tube, while said first and second sharpened cutting tips are in contact with the buffer tube, longitudinally scores the buffer tube so that a section of the buffer can be separated from the buffer tube to provide access to optical fibers contained therein without damage thereto.

2. A tool for accessing optical fibers within a buffer tube, said tool comprising:

A) a body having a through bore for receiving the buffer tube; and

B) a cutting blade mounted to the body including, i) a base portion being bifurcated into first and second prongs, each said prong extending generally in a first direction, ii) a first cutting tip attached to said first prong and extending from said first prong into said bore in a second direction extending substantially perpendicular to said first direction and substantially perpendicular to a line drawn between said first and second prongs, said first cutting tip having a unitary depth limiting means formed thereon spaced from said first prong for limiting penetration of said first cutting tip into the buffer tube so that said first cutting tip does not completely penetrate through an inner surface of the buffer tube, and iii) a second cutting tip attached to said second prong in a spaced apart relationship to said first cutting tip and also extending from said second prong into said bore in said second direction, having a unitary depth limiting means formed thereon spaced from said second prong for limiting penetration of said second cutting tip into the buffer tube so that said second cutting tip does not completely penetrate through an inner surface of the buffer tube;

wherein the first and second cutting tips are oriented such that they point in generally the same direction and so that relative movement of said tool with respect to the buffer tube, while said cutting tips are in contact with the buffer tube, longitudinally scores the buffer tube so that a section of the buffer tube can be separated from the buffer tube to provide access to the optical fibers contained therein.

* * * * *